(12) United States Patent
Morales

(10) Patent No.: US 12,622,346 B2
(45) Date of Patent: May 12, 2026

(54) FERTILIZER BLOCKAGE CLEANING SYSTEM FOR AN AGRICULTURAL FERTILIZER SPREADER

(71) Applicant: DEERE & COMPANY, Moline, IL (US)

(72) Inventor: Oscar De Jesus Morales, Monterrey (MX)

(73) Assignee: Deere & Company, Moline, IL (US)

(*) Notice: Subject to any disclaimer, the term of this patent is extended or adjusted under 35 U.S.C. 154(b) by 893 days.

(21) Appl. No.: 17/835,063

(22) Filed: Jun. 8, 2022

(65) Prior Publication Data

US 2023/0397524 A1 Dec. 14, 2023

(51) Int. Cl.
*A01C 15/04* (2006.01)
*A01C 7/08* (2006.01)
(Continued)

(52) U.S. Cl.
CPC .............. *A01C 15/04* (2013.01); *A01C 7/082* (2013.01); *A01C 7/105* (2013.01); *A01C 7/206* (2013.01); *B05B 15/52* (2018.02)

(58) Field of Classification Search
CPC ......... A01C 7/081; A01C 7/082; A01C 7/105; A01C 15/04
See application file for complete search history.

(56) References Cited

U.S. PATENT DOCUMENTS 3,128,921 A * 4/1964 Henderson ............... A01C 7/20
222/274
4,646,941 A * 3/1987 Grosse-Scharmann ......................
A01C 7/105
222/23
(Continued)

FOREIGN PATENT DOCUMENTS

CA 3010371 A1 * 3/2019 ............. A01C 7/082
CN 102293084 A * 12/2011
(Continued)

OTHER PUBLICATIONS

Extended European Search Report and Written Opinion issued in European Patent Application No. 23177766.5, dated Nov. 7, 2023, in 10 pages.
(Continued)

*Primary Examiner* — Alicia Torres
(74) *Attorney, Agent, or Firm* — Taft Stettinius & Hollister LLP; Stephen F. Rost

(57) ABSTRACT

An agricultural fertilizer system and method for applying a granular fertilizer to a field. A hopper defines a cavity adapted to hold the granular fertilizer and a metering device is coupled to the hopper, and is adapted to deliver a metered amount of fertilizer through a fertilizer hose coupled to a fertilizer spreader. A sensor device is disposed along the
(Continued)

fertilizer hose between the fertilizer hose input and the fertilizer house output to identify a blockage resulting from a build-up of fertilizer. A blower delivers an airflow through an airflow hose operatively connected to the fertilizer hose, wherein the airflow hose is connected to the blower hose between the metering device and the sensor device. The airflow provided by the blower reduces or eliminates a buildup of fertilizer within the fertilizer hose to maintain a proper flow of fertilizer from the metering device and the fertilizer spreader.

17 Claims, 5 Drawing Sheets

(51) Int. Cl.
A01C 7/10 (2006.01)
A01C 7/20 (2006.01)
B05B 15/52 (2018.01)

(56) References Cited

U.S. PATENT DOCUMENTS

| | | | |
|---|---|---|---|
| 7,478,603 B2 | 1/2009 | Riewerts et al. | |
| 8,336,469 B2 | 12/2012 | Preheim et al. | |
| 10,421,625 B2 * | 9/2019 | Henry | A01C 7/082 |
| 11,980,122 B2 * | 5/2024 | Thompson | A01C 7/082 |
| 2007/0266917 A1 | 11/2007 | Riewerts et al. | |
| 2014/0049395 A1 | 2/2014 | Hui et al. | |
| 2016/0219781 A1 | 8/2016 | Henry et al. | |

FOREIGN PATENT DOCUMENTS

| | | | | |
|---|---|---|---|---|
| EP | 0327907 A1 | | 8/1989 | |
| RU | 2581217 C2 | * | 4/2016 | A01B 49/04 |
| WO | WO 2021/183027 A1 | | 9/2021 | |

OTHER PUBLICATIONS

Maschio Gaspardo; Article: MTR Vacuum Planters; pp. 1-36; http://www.maschio.us.

* cited by examiner

FERTILIZER BLOCKAGE CLEANING SYSTEM FOR AN AGRICULTURAL FERTILIZER SPREADER

FIELD OF THE DISCLOSURE

The present disclosure relates to an agricultural fertilizer spreader, and in particular, to a fertilizer spreader row unit for an agricultural fertilizer spreader.

BACKGROUND

An agricultural fertilizer spreader, such as a fertilizer row spreader, deposits fertilizer in rows to prepare the ground for placing seeds in the soil. In different embodiments, the fertilizer row spreader deposits either dry/granular fertilizer or liquid fertilizer. In many embodiments, agricultural planters are capable of depositing fertilizer at the same time as seeding. In these types of agricultural equipment, the fertilizer spreader precedes the row crop planter such that the ground in which the seeds are deposited has been also been fertilized.

The agricultural fertilizer spreader is typically pulled by a tractor, or other work vehicle, and includes a plurality of fertilizer row units, that are aligned side by side to form, on a common frame, a multi-row crop fertilizer spreader. In an agricultural apparatus configured to only fertilize or to fertilize and deposit seeds at the same time, the fertilizer row units and seeding row units of the apparatus are aligned substantially parallel to the travel direction of the tractor when being pulled through a field.

In a fertilizer spreader that spreads granular fertilizer, it is known that the application of the granular fertilizer can build up within hoses that direct the fertilizer to the soil. In some instances, each hose includes a sensor having a channel that is coincident with a channel of the hose. The sensor includes an optical sensor that identifies if a blockage exists. If the optical sensor is blocked, the blockage is sensed which indicates the fertilizer is not being deposited or is being deposited unevenly.

When applying dry/granular fertilizers, it is important that the operator know if every row is applying the fertilizer in a manner that covers the entire area to be planted. Under some conditions, the sensor can be blocked for extended periods of time, before the operator determines that a problem exists. What is needed therefore is a fertilizer row unit having a mechanism to determine if a blockage in any one of the hoses has occurred.

SUMMARY

In one embodiment, there is provided an agricultural fertilizer system for applying a granular fertilizer to soil in a field including a metering device having a cavity adapted to hold the granular fertilizer, wherein the metering device provides gravity fed fertilizer from a metering device output connected to the cavity. A fertilizer hose assembly defines a fertilizer hose channel between a fertilizer hose input and a fertilizer hose output. The fertilizer hose input is operatively connected to the metering device output to receive the gravity fed fertilizer from the metering device, wherein the gravity fed fertilizer flows through the fertilizer hose channel. A sensor device is disposed along the fertilizer hose assembly between the fertilizer hose input and the fertilizer hose output. A blower is adapted to deliver an airflow through a blower hose, wherein the blower hose is operatively connected to the fertilizer hose assembly between the fertilizer hose input and the sensor device. The airflow is directed into the flowing gravity fed fertilizer to accelerate the gravity fed fertilizer through the sensor device and toward the fertilizer hose output. An opener is adapted to provide a trench in the soil and is located at the hose output, wherein the trench receives the accelerated gravity fed fertilizer provided by the hose output.

In some embodiments, the agricultural fertilizer apparatus includes wherein the sensor device has a sensor channel coincident with the hose channel, wherein the sensor device includes an interior surface and an optical sensor directed toward the interior surface to determine granular fertilizer build up on the interior surface.

In some embodiments, the agricultural fertilizer apparatus includes wherein the fertilizer hose assembly has an elbow section including a bend, wherein the bend redirects the flow of gravity fed fertilizer through the elbow section.

In some embodiments, the agricultural fertilizer apparatus includes wherein the sensor device is located between the elbow section and the fertilizer hose assembly output.

In some embodiments, the agricultural fertilizer apparatus includes wherein the elbow section has an air hose inlet operatively connected to the blower hose, wherein the air hose inlet is located at the bend to direct the airflow into the gravity fed fertilizer.

In some embodiments, the agricultural fertilizer apparatus includes wherein the blower is a vacuum blower configured to generate a positive airflow and a negative airflow, and the positive airflow is directed into the air hose inlet.

In some embodiments, the agricultural fertilizer apparatus further includes a hose coupler connected to the hose output and to the fertilizer applicator, wherein the hose coupler directs the accelerated granular fertilizer to the fertilizer applicator.

In some embodiments, the agricultural fertilizer apparatus includes wherein the metering device has an auger moving the granular fertilizer from the cavity to the metering device output. The auger is adapted to deliver the granular fertilizer at a predetermined fertilizer flow rate, wherein the predetermined fertilizer flow rate determines an amount of gravity fed granular fertilizer moving through the fertilizer hose channel.

In some embodiments, the agricultural fertilizer apparatus includes wherein the blower airflow is directed into the fertilizer hose channel between the metering device and the sensor device and is mixed with the stream of gravity fed granular fertilizer along the fertilizer hose channel.

In some embodiments, the agricultural fertilizer apparatus includes wherein the blower airflow accelerates the stream of gravity fed fertilizer prior to flowing past the sensor to maintain sensor cleanliness.

In some embodiments, the agricultural fertilizer apparatus includes wherein the blower airflow does not restrict the flow rate of the gravity fed fertilizer.

In some embodiments, the agricultural fertilizer apparatus includes wherein the blower adjusts the flow rate of the blower airflow in one of a continuous flow rate or a varying flow rate.

In another embodiment, there is provided a method of maintaining a flow of granular fertilizer delivered to the soil of a field though a hose assembly using a metering device coupled to a fertilizer hopper. The method includes: delivering granular fertilizer from the fertilizer hopper to the metering device; delivering a stream of gravity fed granular fertilizer from the metering device to a channel of the fertilizer hose assembly; monitoring the flow of the gravity fed granular fertilizer through the channel of the fertilizer hose assembly with a sensor; directing a flow of air into the fertilizer hose prior to the monitoring the flow of granular fed granular fertilizer, wherein the directed flow of air accelerates the flow of gravity fed granular fertilizer; and identifying a buildup of the gravity fed granular fertilizer with the sensor to determine if the channel is obstructed by a buildup of the gravity fed granular fertilizer.

In some embodiments, the method includes wherein the directing a flow of air includes directing a flow of air into the fertilizer hose with a blower having an adjustable blower airflow rate.

In some embodiments, the method includes wherein the directing a flow of air includes directing a flow of air into the fertilizer hose having one of a continuous flow rate or a varying flow rate.

In some embodiments, the method further includes providing an alert if the identifying a buildup determines that the channel is obstructed.

In an additional embodiment, there if provided an agricultural system for preparing a field for harvesting a crop. The agricultural system includes a tractor having a hitch and a farm implement having a tongue adapted to be coupled to the hitch. The farm implement includes a hopper adapted to hold granular fertilizer and a metering device coupled to the hopper. The metering device is adapted to receive granular fertilizer from the hopper and to meter the granular fertilizer at a predetermined fertilizer flow rate, wherein the predetermined fertilizer flow rate results from the force of gravity to deliver a stream of gravity fed granular fertilizer. The farm implement further includes a fertilizer hose defining a channel between a fertilizer hose input and a fertilizer hose output, wherein the fertilizer hose input is operatively connected to the metering device to receive the stream of gravity fed granular fertilizer from the metering device. A sensor device senses a flow of gravity fed granular fertilizer in the channel, wherein the sensor device is disposed along the fertilizer hose channel between the fertilizer hose input and the fertilizer hose output. A blower is adapted to deliver a blower airflow through a blower hose, wherein the blower hose is connected to the fertilizer hose to accelerate the flow of gravity fed granular fertilizer. An opener is adapted to provide a trench in the soil and is located at the hose output, wherein the trench receives the accelerated gravity fed granular fertilizer provided by the hose output.

In some embodiments, the blower airflow is directed into the fertilizer hose channel between the metering device and the sensor device and is mixed with the stream of gravity fed granular fertilizer along the fertilizer hose channel.

In some embodiments, the agricultural system includes wherein the blower airflow accelerates the stream of gravity fed fertilizer prior to flowing past the sensor to maintain sensor cleanliness.

In some embodiments, the blower is a vacuum blower configured to generate a positive airflow and a negative airflow, wherein the positive airflow is directed through the blower hose and the negative airflow is directed toward a seeder of the farm implement.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
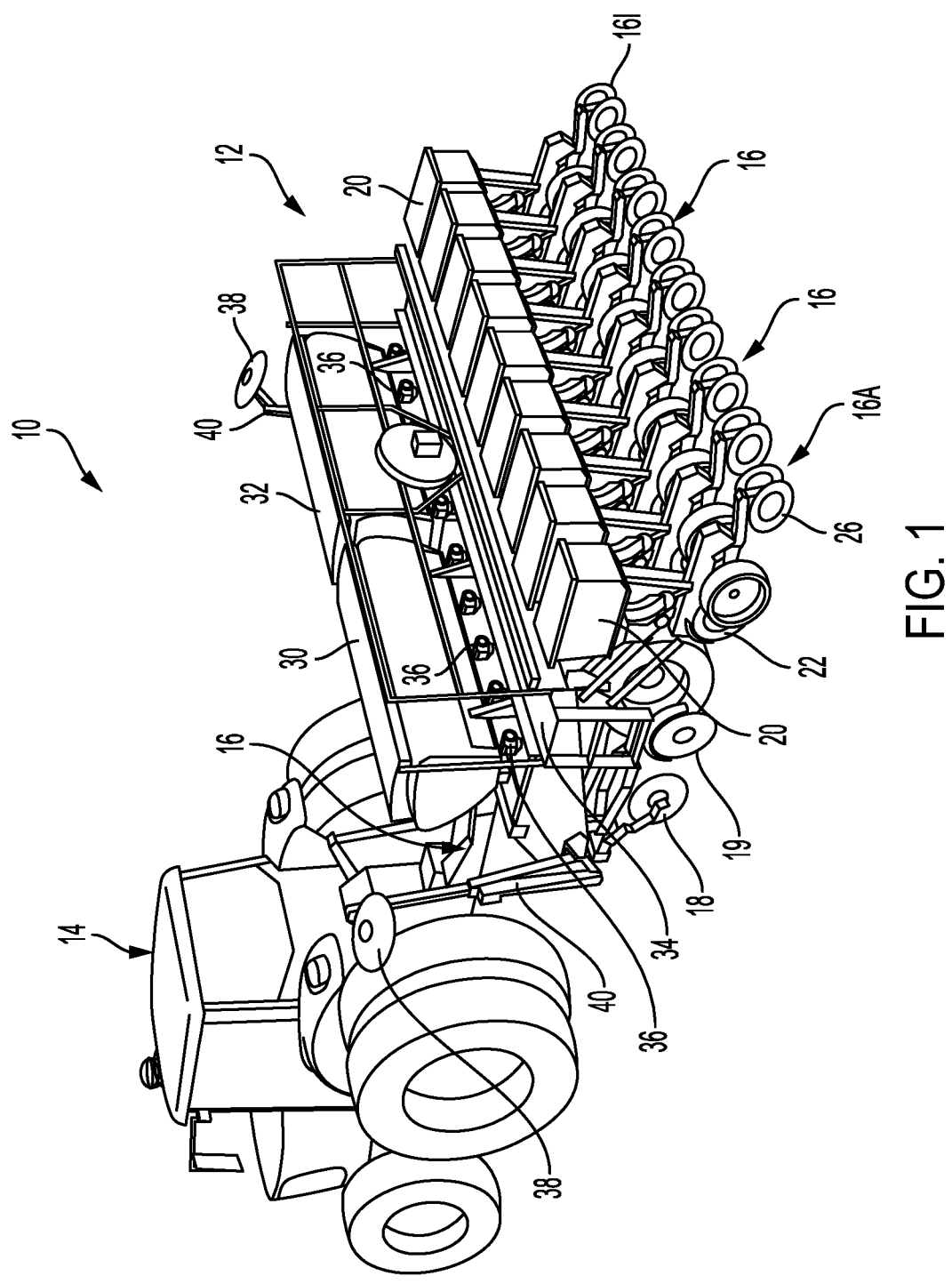
FIG. 1 is a perspective view of an agricultural system including a combination row fertilizer spreader and row crop planter pulled by a work vehicle.

Referring to the drawings, and more particularly to FIG. 1, there is shown an embodiment of an agricultural system 10 including an agricultural implement 12. In the embodiment shown, the agricultural implement 12 is a row fertilizer/seeder, but in other embodiments, the agricultural implement 12 is a fertilizer spreader only. A work vehicle 14, in the form of a tractor, may be coupled to and moves the implement 12 with a suitable coupling arrangement 16, such as a draw bar or 3-point hitch arrangement. Other embodiments are contemplated including an autonomous tractor pulling the implement 12, as well as an entirely self-contained autonomous fertilizer/seeder in which the fertilizer/seeder, or fertilizer spreader, including the row units and a propulsion system, are a complete and unitary seeding system.

The implement 12 may include a number of row units 16, with each row unit 16 being substantially identically configured, in at least one embodiment. Each row unit 16 is configured to cut a trench, apply fertilizer to the soil, and to deposit seeds of varying sizes in respective furrows in the soil for raising crops. As seen in FIG. 1, a row unit 16A includes a disk opener 18, that cuts a trench in which fertilizer is applied, a fertilizer applicator 19, a seed box 20 that delivers seeds to a seeder 22, a press wheel 24 to press the soil adjacent to the cut trench, and a closer 26 to move the soil back into the trench to cover the deposited seeds. In the illustrated embodiment, there are 9 row units, 16A-16I, each of which are similarly configured.

The implement 12 includes a first hopper 30 and a second hopper 32 each of which includes a cavity configured to hold fertilizers or nutrients. The fertilizer held by the hoppers includes, but is not limited to, a dry and granular fertilizer. A longitudinally extending support frame supports the hoppers 30 and 32, a runway 34 to enable an operator to review the operation of the hoppers 30, 32, and the row units 16. The hoppers 30 and 32 each include and support a plurality of metering devices 36 which are located at a lower portion of the hoppers. The metering devices 36 receive gravity fed fertilizer from the hoppers. The number of metering devices 36 corresponds to the number of row units.

First and second marker disks 38 are attached to extendable arms 40, which when extended, cuts a line in the soil to provide the operator an indicator that aids in maintaining consistently located rows when making passes in the field. While FIG. 1 illustrates a first hopper 30 and a second hopper 32, the number of hoppers is not restricted to two hoppers and other numbers of hoppers are contemplated including a single hopper and more than two hoppers.

Figure 2:
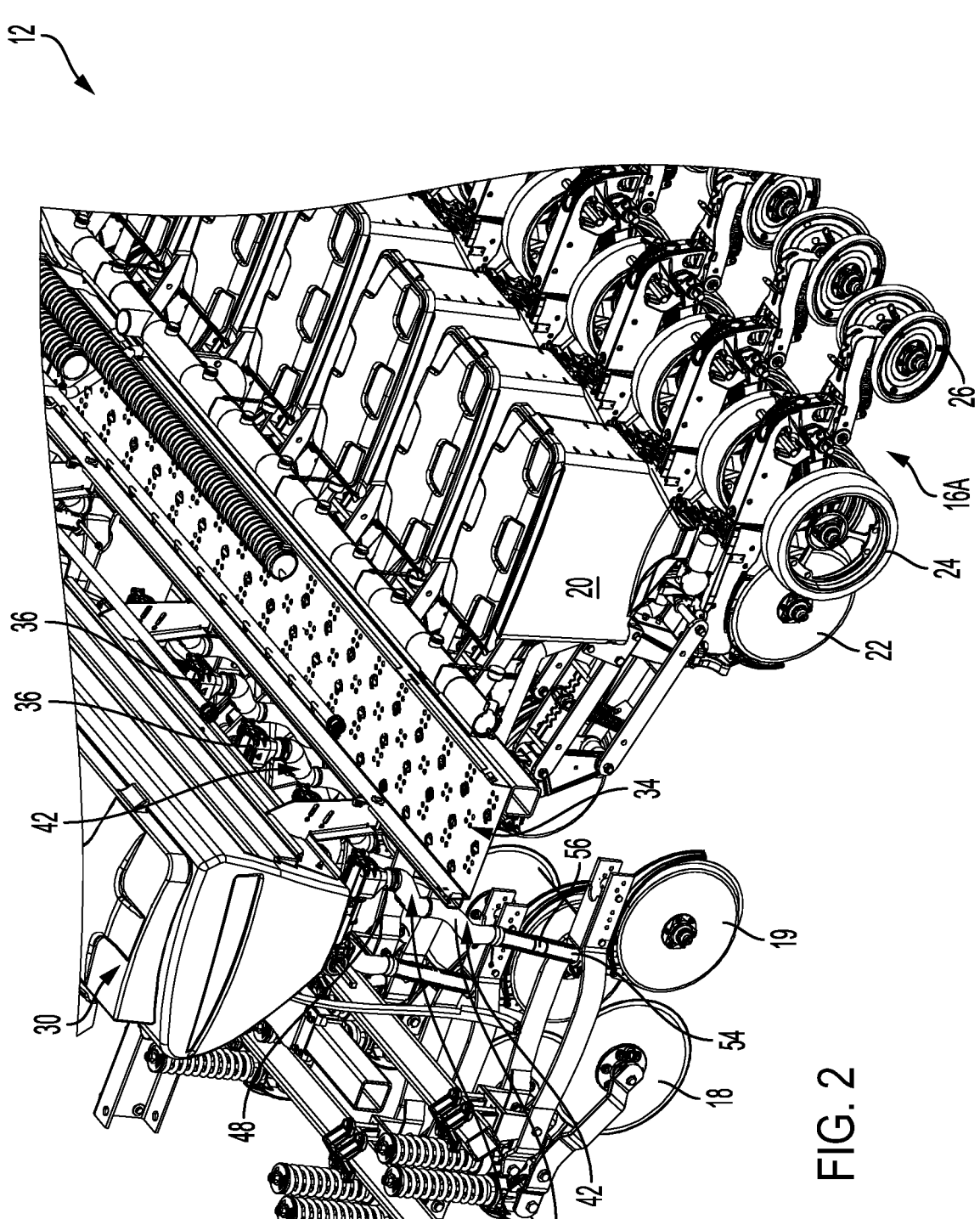
FIG. 2 is a perspective view of one side of a combination row fertilizer spreader and row crop planter.

FIG. 2 illustrates a left-side perspective view of the implement 12. Each of the metering devices 36 are operatively connected to one of the respective fertilizer applicators 19 through a hose assembly 42, that includes one or more elbow sections 44, one of which is connected to a fertilizer output 48 of the metering device 36, and a hose. One end 52 of the hose 50 is coupled to one of the elbow sections 44 and another end 54 of the hose 50 is coupled to the fertilizer applicator 19. A sensor device 56 is located between the one end 52 of the hose 50 and the other end 54 of the hose.

Figure 3:
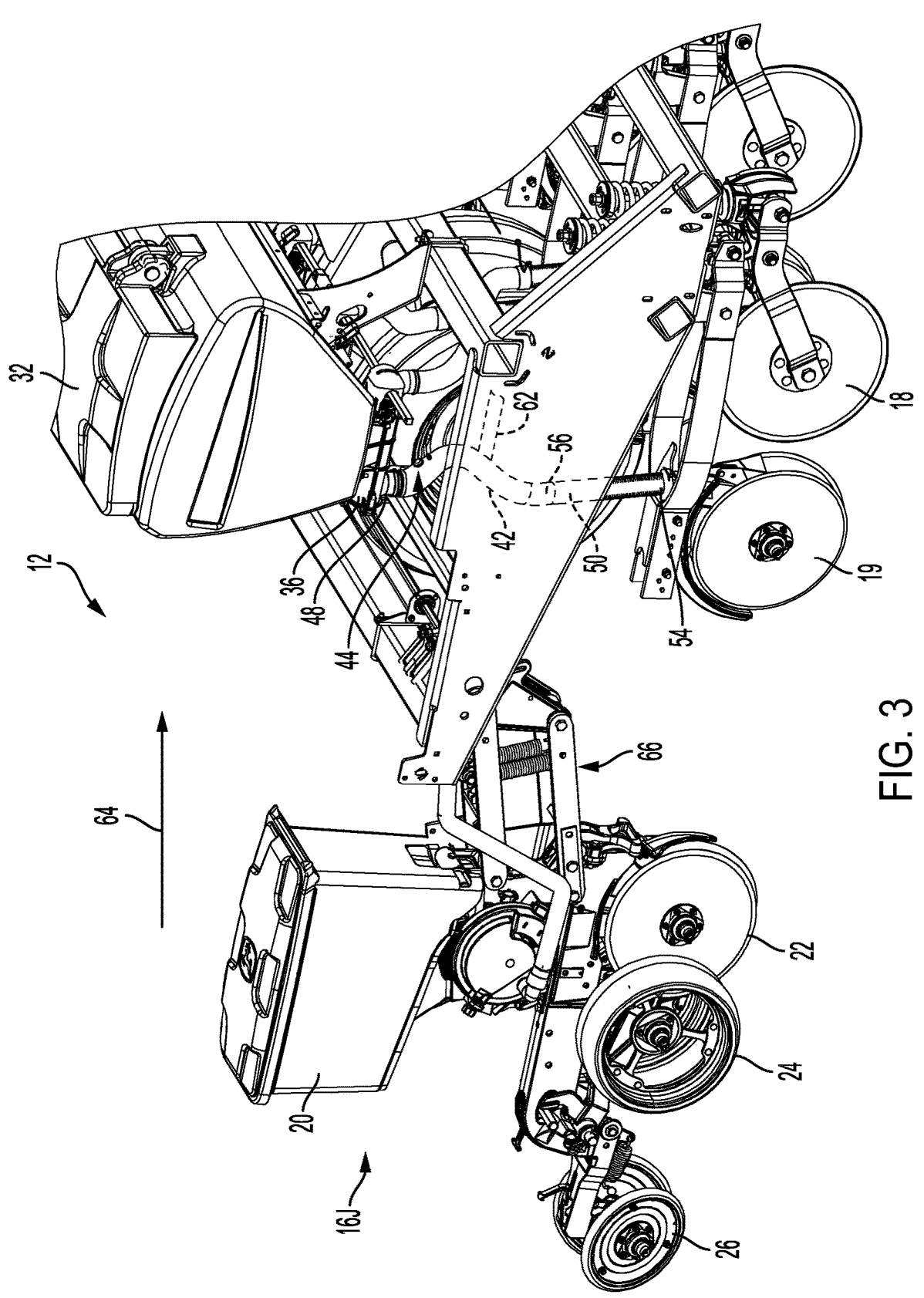
FIG. 3 is a perspective view another side of a combination row fertilizer spreader and row crop planter.

FIG. 3 illustrates a portion of the right hand side of the implement 12, including the row unit 16I. This right hand side of implement 12 is configured to include the same or similar features of each of the remaining row units 16. Other row units are not shown. A blower system 60 (See FIG. 4) includes an airflow hose 62, a portion of which is illustrated FIG. 3. The airflow hose 62 is operatively connected to the hose assembly 42 and delivers a flow of air to the hose assembly 42. As the row units move in a direction 64 while being pulled by the tractor 14, fertilizer held in the hopper 32, is metered by the metering device 36 to be delivered to the fertilizer applicator 19. The metering device 36 is adapted to meter the granular fertilizer at a predetermined fertilizer flow rate, wherein the predetermined fertilizer flow rate results from the force of gravity to deliver a stream of gravity fed granular fertilizer through the channels of each of the elbow sections 44 and hose 50 of the hose assembly 42.

Once the fertilizer is metered to a selected amount, the fertilizer falls by gravity through the hose assembly 42, and in particular through the sensor device 56 that monitors the flow of fertilizer. The fertilizer is directed through the sensor device 56 and to the fertilizer applicator 19 which deposits the fertilizer in a trench cut by the disk opener 18. The seed box 20 and related components, i.e. the seeder 22, the press wheel 24, and the closer 26, are all connected to a suspension assembly 66 which reduces the impact of a changing terrain while seeding occurs.

Figure 4:
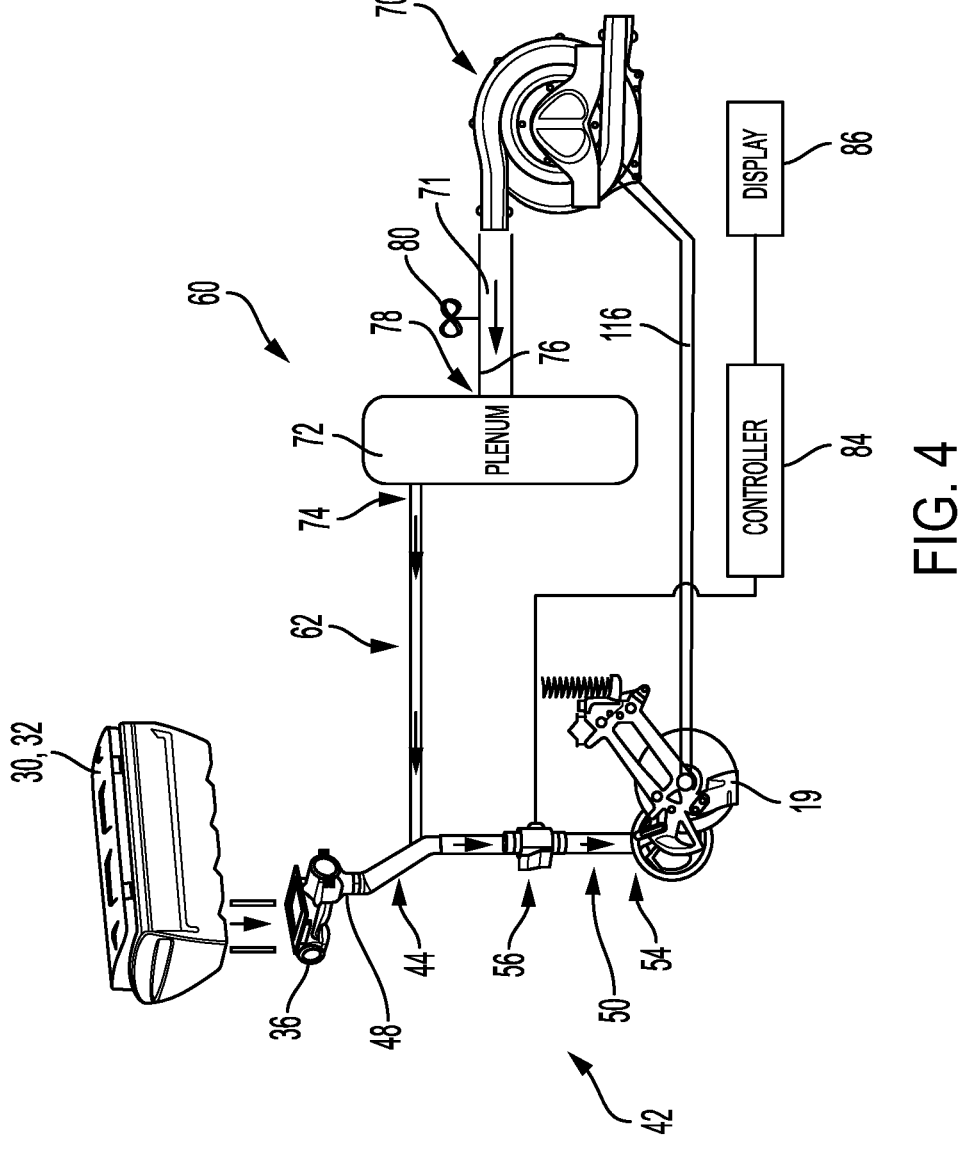
FIG. 4 is diagrammatic representation of a system for determining a blockage located in a single row unit of a fertilizer spreader apparatus.

FIG. 4 illustrates a diagrammatic representation of the blower system 60 for maintaining fertilizer flow from the metering device 36 to the fertilizer applicator 19 and for determining a blockage located in a single row unit of a fertilizer spreader apparatus. The sensor device 56 is disposed inline with the fertilizer hose 50 between the metering device output 48 and the fertilizer hose output 54. A blower 70 generates a flow of air 71 delivered by the airflow hose 62 which is coupled to the blower 70 through a plenum 72. The plenum 72 is an air distribution box that receives forced air generated by the blower 70 through a blower hose 76 coupled to an input 78 of the plenum. The forced air moves through the plenum 72 and is delivered to the airflow hose 62 which is coupled to an output 74 of the plenum 72. While not illustrated in FIG. 4, in other embodiments a single plenum 72 is used to deliver airflow from a plurality of plenum outputs (not shown) to a plurality of airflow hoses 62 (not shown), in which each one of the airflow hoses is connected to the fertilizer spreader 19 of one of the row units 16. In other embodiments, each of the row units 16 includes its own plenum.

The airflow delivered by the airflow hose 62, received from the plenum 72, is directed into the channel of the hose assembly 42 at a location between the metering device 36 the sensor device 56. The airflow is mixed with the stream of gravity fed granular fertilizer. Other locations of directed airflow are contemplated including into the channel of the hose 50 prior to the sensor device 56. The injection of airflow affects the stream of gravity fed fertilizer prior to flowing past the sensor device 56. The flow speed of the gravity fed fertilizer is increased and flows through the sensor device 56, which reduces the amount of fertilizer that can collect in the sensor device 56, if no injected airflow is present.

The airflow delivered by the blower 70 to the airflow hose 62 is set to deliver an airflow through the sensor 56. In one embodiment, a valve 80 is connected to the blower hose 76 to regulate the flow of air provided to the plenum 72 and ultimately to the assembly 44. In other embodiments, the airflow provided to the plenum 72 is adjusted by controlling the blower speed of the blower 70.

In one embodiment, the blower 70 is a vacuum blower. In different embodiments, the flow rate of the vacuum blower airflow includes a number of different air flow speeds, wherein each of the vacuum blower air flow speeds do not substantially change the flow rate of the gravity fed fertilizer.

In another embodiment, the flow rate of the vacuum blower is adjusted to provide a flow rate that is a continuous flow rate. The continuous airflow rate of the vacuum blower is delivered to the hose assembly 42 at the same time the metering device 36 is releasing fertilizer.

The sensor device 56 provides a status of the flow of fertilizer through the sensor over a line 82 coupled to a controller 84. The controller 84 includes a processor and memory, wherein the memory is configured to store program instructions and the processor is configured to execute the stored program instructions to determine the status of the sensor device 56. In one embodiment, the sensor device 56 includes an optical sensor to determine the extent of blockage in the sensor, which provides the status of fertilizer flow through the host assembly 42. The controller 84 is coupled to a display 86. In one embodiment, each of the sensor devices 56 provide a status signal to the controller 84 which is used by the controller 84 to determine the amount of blockage of each of the sensors. This information is displayed on the display 86 for viewing by the operator. In this way the operator determines if one or more of the sensors has a buildup of fertilizer, or is blocked, and requires cleaning. In another embodiment, the controller is coupled to an alert device which provides a visual or audible alert to the operator to check for blockages in one or more of the sensors that have been identified as having an blockage.

Figures 5, 6:
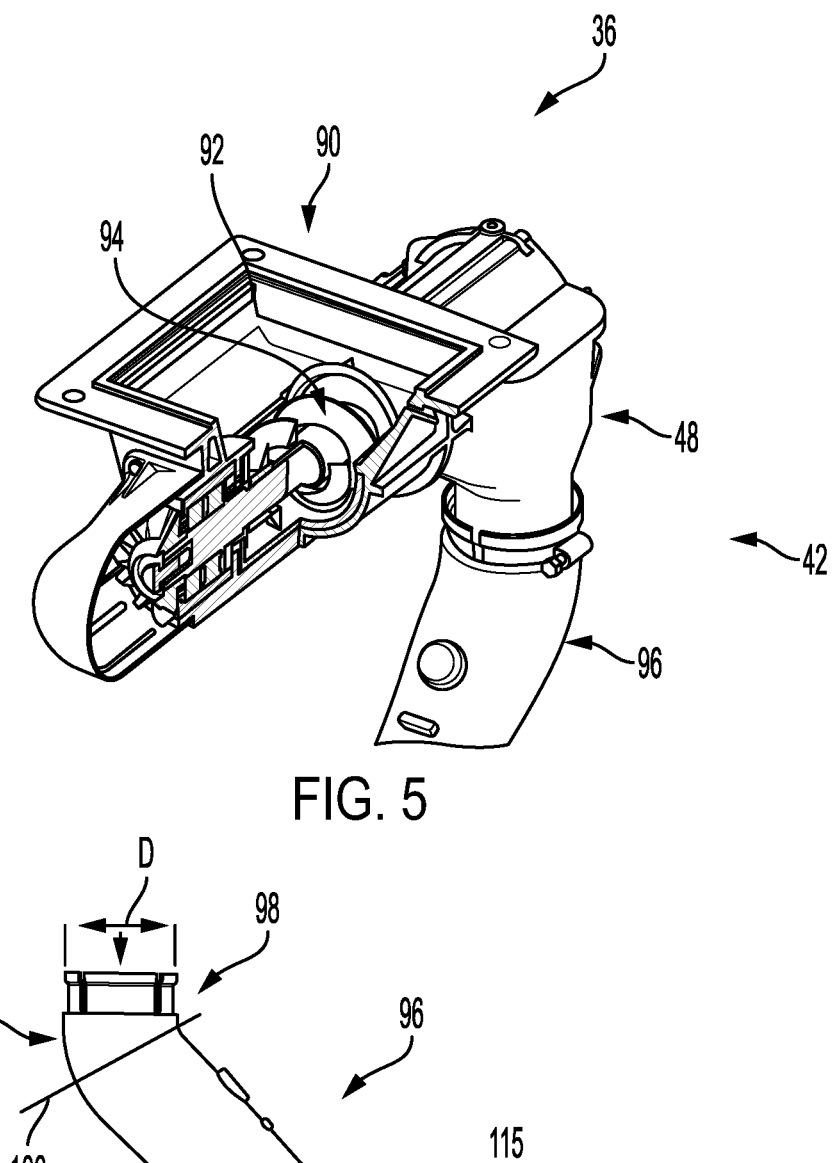
FIG. 5 illustrates a delivery device for delivering fertilizer from a hopper.
FIG. 6 illustrates an elbow section for connecting to a delivery device to direct gravity fed fertilizer.

FIGS. 5 and 6 illustrate one of the metering devices 36 for delivering a metered amount of fertilizer from one of the hoppers 30 or 32. The metering device 36 includes a housing 90 that receives gravity fed fertilizer from one the hoppers 30, 32 or other storage containers. The housing 90 is connected to an opening of the hopper and receives the gravity fed fertilizer in a chamber 92 formed by the housing 90. An auger 94 extends into the cavity 92 and rotates to move the fertilizer into the fertilizer outlet 48. The hose assembly 42, in this embodiment, includes an elbow section 96. In one embodiment, the elbow section 96 is a unitary one-piece part. As described herein, the gravity fed fertilizer is initially fed by gravity only as the fertilizer is delivered by the auger 94 to the outlet 48.

A first end 98 of the elbow section 96 is fixedly connected to the fertilizer output 48. A second end 100 is operatively connected to the fertilizer spreader 19 through the hose 50 and the sensor 56. In one embodiment, the elbow section 96 includes a tubular structure defining a channel having a generally circular cross section that extends from the first end 98 to the second end 100. The first end 98 includes an aperture, which is generally perpendicular to the fertilizer outlet 48 to enable an unobstructed flow of fertilizer from the chamber 92 into the elbow 96.

As seen in the embodiment of FIG. 6, the elbow section 96 includes a first portion 102 connected to a second portion 104 at a change of direction line 106. The second portion 104 is connected to a third portion 108 at a change of direction line 110. The second portion 104 includes a gradually reduced taper from the line 106 to the line 110. The tapered section 104 includes a gradually reduced cross-section wherein the diameter of the tube tapers from the line 106 toward a smaller diameter at the line 110. In one embodiment, the tapered section accelerates airflow.

The gravity fed fertilizer initially flows from the chamber 92 along a generally vertical line 112, where the direction of direction of flow of the gravity fed fertilizer changes at line 106 and again at line 110. An air hose inlet 114 is generally located at the line 110 and is coupled to the airflow hose 62 of FIG. 4. The diameter of the portion 108 is reduced when compared to the portion 104. While the portion 104 is inclined with respect to the vertical direction 112 at a first angle, the portion 108 is less inclined than the inclination of the second portion 104 and is directed in a more generally downward direction when compared to the section 104. The air hose inlet 114 is also inclined with respect to the vertical direction 112 and is centered along the line 110.

The air hose inlet 114 receives a flow of air provided by the blower 70. The flow of air is introduced through the air hose inlet 114 and directed into the gravity fed fertilizer flowing from the inlet 98, and through the second portion 104. As the gravity fed fertilizer moves from the second portion 104 to the third portion 108, the airflow is directed into the flowing gravity fed fertilizer through the inlet 114. The airflow from the hose 62 is directed along the line 115 through the inlet 114 in a downward direction toward a bend 118 centered along the line 110. The convergence of the gravity fed fertilized and the airflow from the hose 62 accelerates and disturbs the flow of the fertilizer that exits the second end 100. The blower airflow does not restrict the flow rate of the gravity fed fertilizer.

In this embodiment, the airflow is directed into the flowing gravity fed fertilizer at the location 118 where the flow of fertilizer changes direction from the second portion 104 to the third portion 108. The airflow stimulates or accelerates the flow of the gravity fed fertilizer such that the accelerated fertilizer moves more quickly past the sensor 56. This enhanced movement of gravity fed fertilizer prevents the fertilizer from sticking to or building up at the interior wall or surface of the sensor 56. As described herein, the gravity fed fertilizer is initially fed by gravity only as the fertilizer is moves past the outlet 48. Once the gravity fed fertilizer moves at of past the inlet 114, the velocity of the gravity fed fertilizer is longer affected only by gravity. After being injected with the positive airflow, the velocity of the gravity fed fertilizer is increased, and is at least temporarily accelerated. Consequently, the term "accelerated gravity fed fertilizer", as used herein, indicates that the flow rate of the gravity fed fertilizer has been increased.

In one or more embodiments, the blower 70 is a vacuum blower that is used for two purposes. One purpose to provide a negative pressure, i.e. vacuum, to the air seeders (i.e. seed meters), through a line 116, as seen in FIG. 4. The line 116 applies a vacuum to the seeder 19, which used to hold individual seeds at a seed plate before each of the individual seeds is sequentially displaced from the seed plate and deposited in a seeding tube. The other purpose of the vacuum blower is to use the exhaust air of the vacuum blower 70, which is a positive airflow and which is delivered through the hose 62 into the inlet 114. The positive airflow accelerates the gravity fed fertilizer through the elbow section 96. In one different embodiments, the positive airflow is a continuous positive airflow. In another embodiment the positive airflow is a discontinuous positive airflow which includes alternating positive airflows separated by a lack of airflow or a reduced airflow.

The air speed of the airflow input to the air hose inlet 114 is based on the vacuum level which the customer sets for the air seeders 19. In different embodiments, once the vacuum level is set by the customer, the resulting positive airflow that accelerates the movement of gravity fed fertilizer is sufficient to maintain the sensor 56 in a relatively clean condition. Consequently, if the seeder 19 is running at the highest seed deposit rate permitted, or at the lowest seed deposit rate permitted, the fertilizer blockage cleaning system maintains a relatively clean sensor at the highest vacuum level, the lowest vacuum level, and at levels between the highest and lowest levels. The blower 70 increases fertilizer speed at the same time as the seeder deposits seeds to the soil, while maintaining the operation of the sensor.

While exemplary embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An agricultural fertilizer system for applying a granular fertilizer to soil in a field comprising:

a metering device including a cavity adapted to hold the granular fertilizer, wherein the metering device provides gravity fed fertilizer from a metering device output connected to the cavity;

a fertilizer hose assembly defining a fertilizer hose channel between a fertilizer hose input and a fertilizer hose output, the fertilizer hose input operatively connected to the metering device output to receive the gravity fed fertilizer from the metering device, wherein the gravity fed fertilizer flows through the fertilizer hose channel, the fertilizer hose assembly including an elbow section having a first portion joined to a tapered second portion at a first change of direction line and the tapered second portion joined to a less inclined third portion at a second change of direction line, the third portion being directed more downward than the tapered second portion;

a sensor device disposed along the fertilizer hose assembly between the fertilizer hose input and the fertilizer hose output;

a blower adapted to deliver an airflow through a blower hose into the fertilizer hose channel between the fertilizer hose input and the sensor device, wherein the blower hose is operatively connected to the fertilizer hose assembly between the fertilizer hose input and the sensor device, wherein the airflow is delivered from the blower hose into the fertilizer hose channel to accelerate the gravity fed fertilizer flowing within the fertilizer hose channel through the sensor device and toward the fertilizer hose output;

an air inlet centered at the second change of direction line and coupled to the blower hose to direct airflow downward toward a bend at the second change of direction line and into the gravity fed fertilizer; and an opener adapted to provide a trench in the soil and located at the fertilizer hose output, wherein the trench receives the accelerated gravity fed fertilizer provided by the fertilizer hose output.

2. The agricultural fertilizer apparatus of claim 1 wherein the sensor device includes a sensor channel coincident with the hose channel, wherein the sensor device includes an interior surface and an optical sensor directed toward the interior surface to determine granular fertilizer build up on the interior surface.

3. The agricultural fertilizer apparatus of claim 1 wherein the blower is a vacuum blower configured to generate the airflow as a positive airflow and a negative airflow, wherein the positive airflow is directed into the air inlet.

4. The agricultural fertilizer apparatus of claim 3 further comprising a hose coupler connected to the fertilizer hose output and to a fertilizer applicator, wherein the hose coupler directs the accelerated granular fertilizer to the fertilizer applicator.

5. The agricultural fertilizer apparatus of claim 1 wherein the metering device includes an auger moving the granular fertilizer from the cavity to the metering device output, the auger adapted to deliver the granular fertilizer at a predetermined fertilizer flow rate, wherein the predetermined fertilizer flow rate determines an amount of gravity fed granular fertilizer moving through the fertilizer hose channel.

6. The agricultural fertilizer apparatus of claim 5 wherein the blower airflow is directed into the fertilizer hose channel between the metering device and the sensor device and is mixed with the stream of gravity fed granular fertilizer along the fertilizer hose channel.

7. The agricultural fertilizer apparatus of claim 6 wherein the blower airflow accelerates the stream of gravity fed fertilizer prior to flowing past the sensor to maintain sensor cleanliness.

8. The agricultural fertilizer apparatus of claim 6 wherein the blower airflow does not restrict the flow rate of the gravity fed fertilizer.

9. The agricultural fertilizer apparatus of claim 8 wherein the blower adjusts the flow rate of the blower airflow in one of a continuous flow rate or a varying flow rate.

10. A method of maintaining a flow of granular fertilizer delivered to the soil of a field through a hose assembly using a metering device coupled to a fertilizer hopper, the method comprising:

delivering granular fertilizer from the fertilizer hopper to the metering device;

delivering a stream of gravity fed granular fertilizer from the metering device to a channel of the fertilizer hose assembly, the fertilizer hose assembly including an elbow section having a first portion joined to a tapered second portion at a first change of direction line and the tapered second portion joined to a less inclined third portion at a second change of direction line, the third portion being directed more downward than the tapered second portion;

monitoring the flow of the gravity fed granular fertilizer through the channel of the fertilizer hose assembly with a sensor disposed along the fertilizer hose assembly between a fertilizer hose input and a fertilizer hose output;

directing a flow of air with a blower through a blower hose into the channel between the fertilizer hose input and the sensor and into the flow of the gravity fed granular fertilizer prior to the monitoring, wherein an air inlet centered at the second change of direction line is coupled to the blower hose to direct airflow downward toward a bend at the second change of direction line and into the gravity fed granular fertilizer, thereby accelerating the flow of gravity fed granular fertilizer within the channel; and identifying a buildup of the gravity fed granular fertilizer with the sensor to determine if the channel is obstructed by a buildup of the gravity fed granular fertilizer.

11. The method of claim 10 wherein the directing a flow of air includes adjusting a blower airflow rate and selecting either a continuous flow rate or a varying flow rate.

12. The method of claim 10 wherein the accelerated gravity fed granular fertilizer flows past the sensor to maintain sensor cleanliness without restricting the gravity-fed flow rate.

13. The method of claim 10 further comprising providing an alert if the identifying a buildup determines that the channel is obstructed.

14. An agricultural system for preparing a field for harvesting a crop comprising:

a tractor including a hitch; and a farm implement including a tongue adapted to be coupled to the hitch, the farm implement including:

a hopper adapted to hold granular fertilizer;

a metering device coupled to the hopper to receive granular fertilizer from the hopper and to meter the granular fertilizer at a predetermined fertilizer flow rate, wherein the predetermined fertilizer flow rate results from the force of gravity to deliver a stream of gravity fed granular fertilizer;

a fertilizer hose assembly including an elbow section having a first portion joined to a tapered second portion at a first change of direction line and the tapered second portion joined to a less inclined third portion at a second change of direction line, the third portion being directed more downward than the tapered second portion, the fertilizer hose assembly defining a fertilizer hose channel between a fertilizer hose input and a fertilizer hose output, the fertilizer hose input operatively connected to the metering device to receive the stream of gravity fed granular fertilizer from the metering device;

a sensor device to sense a flow of gravity fed granular fertilizer in the fertilizer hose channel, the sensor device disposed along the fertilizer hose channel between the fertilizer hose input and the fertilizer hose output;

a blower adapted to deliver a blower airflow through a blower hose, wherein the blower hose is connected to the fertilizer hose assembly to deliver the blower airflow from the blower hose and into the fertilizer hose channel at a bend in the fertilizer hose channel between the fertilizer hose input and the sensor device, wherein an air inlet centered at the second change of direction line is coupled to the blower hose to direct airflow downward toward a bend at the second change of direction line and into the gravity-fed granular fertilizer to accelerate the flow of gravity fed granular fertilizer within the fertilizer hose channel; and an opener adapted to provide a trench in the soil and located at the fertilizer hose output, wherein the trench receives the accelerated gravity fed granular fertilizer provided by the fertilizer hose output.

15. The agricultural system of claim 14 wherein the blower airflow is directed into the fertilizer hose channel between the metering device and the sensor device at the air inlet and is mixed with the stream of gravity fed granular fertilizer along the fertilizer hose channel.

16. The agricultural system of claim 15 wherein the blower airflow directed downward toward the bend at the second change of direction line accelerates the stream of gravity fed fertilizer prior to flowing past the sensor to maintain sensor cleanliness.

17. The agricultural system of claim 16 wherein the blower is a vacuum blower configured to generate a positive airflow and a negative airflow, wherein the positive airflow is directed through the blower hose and the negative airflow is directed toward a seeder of the farm implement.

\* \* \* \* \*